March 1, 1949.  F. F. POLAND  2,463,468
METHOD FOR RECOVERING ZINC FROM ZINCIFEROUS
MATERIAL CONTAINING IRON
Filed Sept. 6, 1945  2 Sheets-Sheet 1

Inventor:
Frank F. Poland,
by Emery Booth Townsend Miller & Weidner
Attys

March 1, 1949.　　　　F. F. POLAND　　　　2,463,468
METHOD FOR RECOVERING ZINC FROM ZINCIFEROUS
MATERIAL CONTAINING IRON
Filed Sept. 6, 1945　　　　　　　　　　2 Sheets-Sheet 2
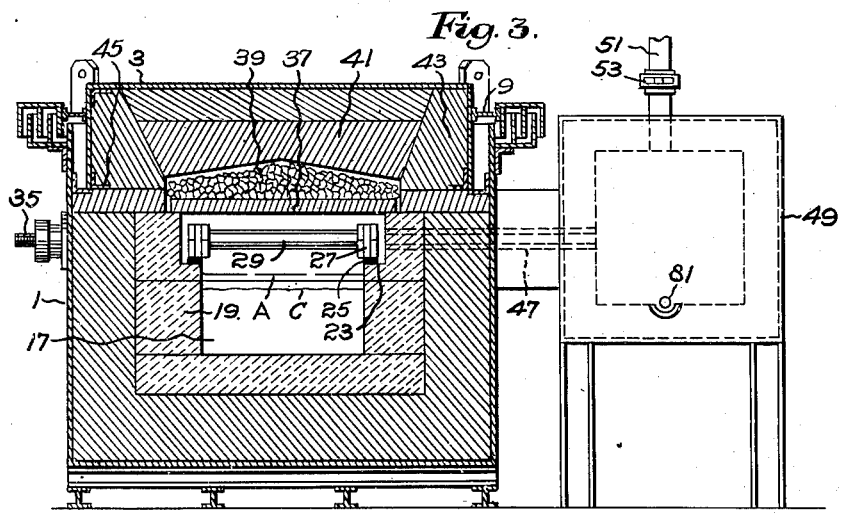
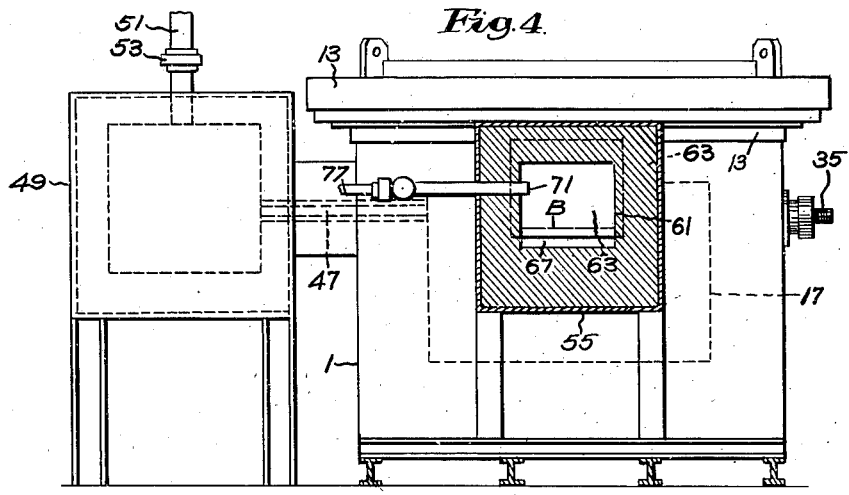
Inventor:
Frank F. Poland,
by Emery Booth Townsend, Miller & Weidner
Attys Patented Mar. 1, 1949

2,463,468

UNITED STATES PATENT OFFICE 2,463,468

METHOD FOR RECOVERING ZINC FROM ZINCIFEROUS MATERIAL CONTAINING IRON

Frank F. Poland, Rome, N. Y., assignor to Revere Copper and Brass Incorporated, Rome, N. Y., a corporation of Maryland Application September 6, 1945, Serial No. 614,619

2 Claims. (Cl. 75—24)

My invention relates to a method for recovering zinc from zinciferous material containing iron.

In the hot galvanizing of iron to produce, for example, galvanized iron sheets the iron sheet after being coated with a suitable flux is dipped into a bath of molten zinc. The small amount of iron from each sheet is dissolved by the liquid zinc and forms an intermetallic compound of iron and zinc. This compound floats on the top of the bath and is from time to time skimmed off. Such skimmings, which are commonly termed "zinc dross," have a melting point of about 1300° F. as compared to about 790° F. for zinc. The compositions of the skimmings vary, but in general they contain about 6% iron, and usually impurities such as lead that may be present in the bath. A typical analysis of the skimmings is iron 6%, lead 1%, zinc balance.

According to a preferred way of practising the present invention, the zinc dross is melted and charged into a furnace chamber to form therein a rather deep pool having an extensive free upper surface. The pool is then heated in this chamber under non-oxidizing conditions, preferably by heat radiated downwardly on its free surface, to raise its temperature sufficiently to cause zinc to be evaporated therefrom while retaining the iron and lead contents of the dross. These zinc vapors are conducted from the furnace, preferably to a zinc condenser where they are cooled to precipitate them as liquid zinc, which latter may from time to time be tapped from the condenser and cast to form slabs of metallic zinc. As the vaporizing operation proceeds the molten dross quickly becomes saturated with the iron content which separates out as a solid and sinks as a residue to the bottom of the pool. Fresh molten dross is charged into the chamber from time to time until such accumulation of the residue occurs as to warrant its removal. This residue, which consists of about 85% iron admixed with zinc, or admixed with zinc-lead alloy if lead is present in the dross, has an extremely high melting point in the neighborhood of 2600° F. It strongly adheres to the bottom and side walls of the furnace chamber, and cannot be removed by mechanical means without considerable difficulty and destructive injury to the expensive furnace lining and without first cooling down and opening the furnace. To remove the residue, according to the present invention the temperature of the furnace is raised to a point sufficient to melt the residue, say about 2750° F., whereupon it is tapped from the furnace to clear the latter of the same. Upon such removal of the residue the above described cycle of operations may be repeated. In this way it is possible to recover better than 90% of the zinc contained in the dross charged to the furnace.

In the above example of the practice of the method, it will be observed that for performing the evaporating operation the temperature of the molten dross is raised to a point less than the melting point of the residue so as to maintain the latter in solid condition and cause it to sink, with the result that the material adjacent the surface of the pool contains a maximum of zinc. If the dross were heated to such temperature as would cause the iron constituent to be continually in molten condition, not only would an increased energy input to the furnace be necessary and the furnace lining deteriorate rapidly, but the molten constituents of the pool would contain a progressively decreasing percentage of zinc. This percentage decrease would cause a progressive decrease in the rate of zinc evaporation and make it necessary to clear the furnace chamber from time to time of dross which in the aggregate would contain a large amount of zinc, with the net result of such costly and otherwise uneconomical operation as to be impractical. It has been found that heating the dross to a temperature of about 1700 to 2000° F. for performing the evaporating operation will secure best results in respect to satisfactory and economic operation.

The accompanying drawings show a preferred embodiment of apparatus for use in practising the invention.

Figure 1:
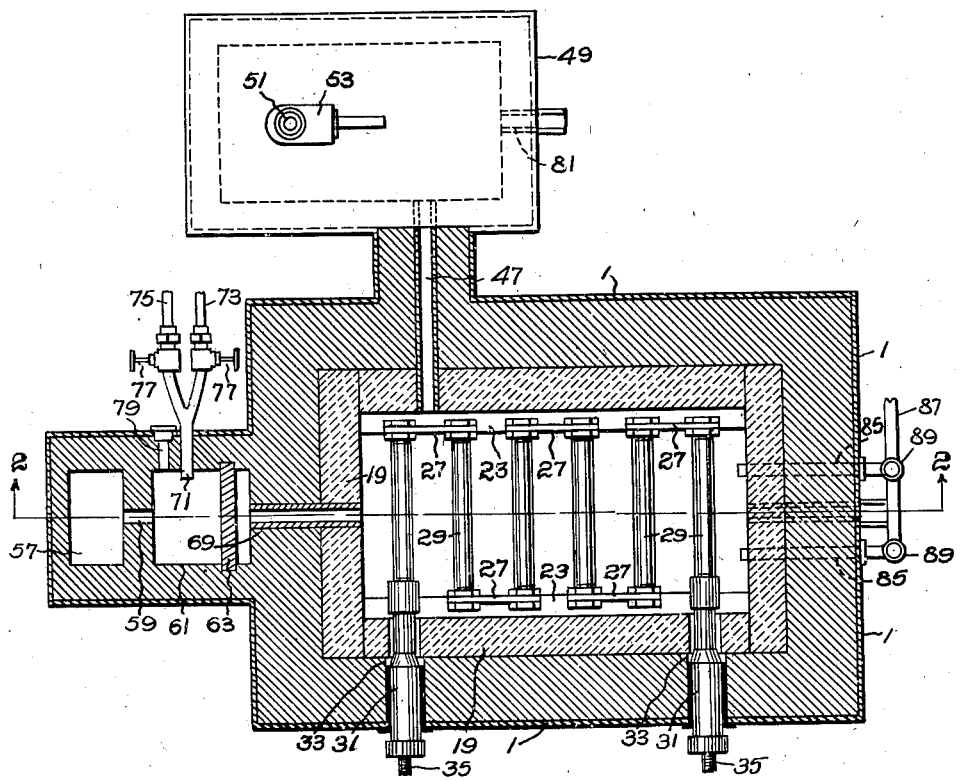
Fig. 1 is a section on the line 1—1 of Fig. 2, with parts in elevation.
Figure 2:
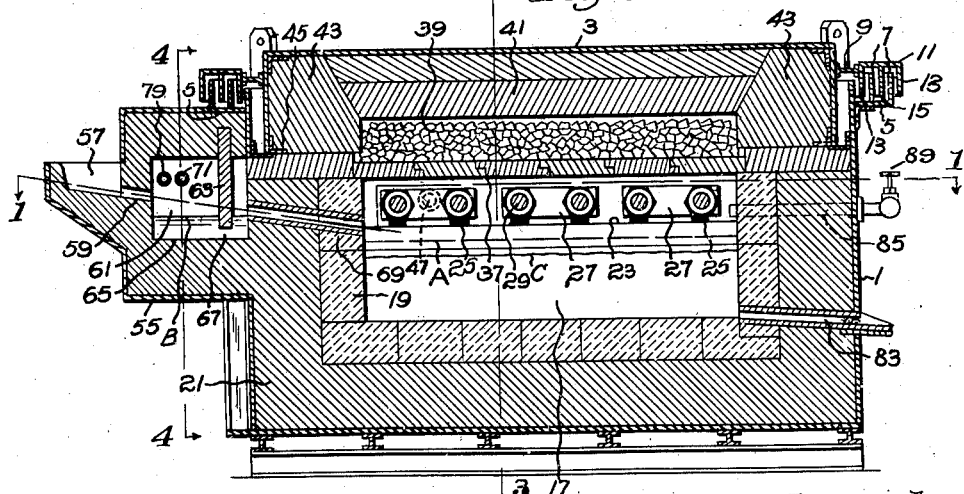
Fig. 2 is a section on the line 2—2 of Fig. 1.

Figs. 3 and 4 are, respectively, sections on the lines 3—3 and 4—4 of Fig. 2.

As illustrated in the drawings, the furnace has a lower body portion which comprises a metallic casing 1, and a removable cover portion which comprises a metallic casing 3. As shown, the casing 1 is provided adjacent its upper edge with a horizontal flange 5 which extends continuously about the four sides of the casing, this flange carrying spaced upwardly extending vertical flanges 7 which likewise extend continuously about the four sides of the casing. The casing 3 of the cover portion of the furnace is provided with an outwardly extending bracket or flange 9 extending continuously about the four sides of said casing. This bracket carries a channel-shaped member 11 having downwardly extending webs 13 and a central downwardly extending flange 15, the member 11 and flange 15 likewise extending continuously about the casing. As clearly illustrated in Fig. 2, the upwardly extending flanges 7 are received in the spaces between the flange 15 and webs 13. The spaces between the flanges 7 and that portion of the casing 1 which is above the flange 5 may be filled with oil or sand, into which project the flange 15 and that web 13 which is adjacent the casing. In this way a labyrinth seal is formed to exclude air from the two casings when the cover is in place.

The furnace chamber 17 is shown as provided with a lining 19, which lining may be of suitable refractory material such as silicon carbide, clay-graphite mixture, or the like. The lining, as shown, is supported and backed by a filler 21 which may be formed of refractory firebrick.

As illustrated, the opposite side walls of the lining 19 are formed to provide shelves 23 near the top of the furnace chamber. On these shelves rest blocks 25 of heat refractory electric insulating material such as aluminum oxide $Al_2O_3$. On these blocks are supported plates 27 of electric conductive material such as graphite. Extending between the plates at opposite sides of the furnace chamber in secured relation to said plates are heating resistors 29 which also may be formed of graphite, the arrangement being such that the plates 27 connect the resistors for series flow of current through them. As shown, the resistors at the ends of the row of resistors are connected to extensions 31 leading through openings 33 in the furnace walls, in electric insulated relation thereto, to the exterior of the casing 1, the extensions at the exterior of the casing being provided with terminals 35 for connection to the source of energizing current for the resistors.

Resting on the top of the lining 19 and extending transversely across the furnace are shown lapped slabs 37, preferably formed of graphite, which act to reflect heat downwardly. Resting on the furnace roof formed by these slabs is a layer 39 of insulating material, preferably granulated carbon.

The casing 3 of the removable cover of the furnace, as shown, contains a central arch 41, of refractory material, resting on abutments 43 of such material, the latter being retained in the casing 3 by the flanges 45 secured thereto and extending about the four sides of the casing interiorly thereof adjacent its lower edge.

As shown, leading through the walls of the furnace chamber is a conduit 47 for discharging zinc vapors to a condenser 49, the condenser being provided with a vent 51 having therein an adjustable damper or valve 53 for regulating the pressure in the condenser and furnace chamber.

For charging the furnace chamber with the molten zinc dross the casing 1 is provided with an extension 55 in which is contained a body of firebrick or the like built up to form a funnel 57 into which the molten dross may be poured from a ladle. The discharge opening 59 of the funnel leads to an interior chamber 61 formed in the body of firebrick. This chamber is divided into two compartments by a slab 63, of refractory material, extending from the top of the chamber to adjacent its bottom 65 so as to form beneath the slab a passage 67. Leading from the compartment at the right of the slab 63 as viewed in Fig. 2 is a passage 69 which extends through the furnace walls and opens into the furnace chamber well above its bottom. In operation, when the molten dross is poured into the funnel 57 it will discharge into the furnace chamber through the passage 69 to fill the same to the desired level. When the pouring operation is discontinued there will remain in the chamber 61 a pool of material the upper level B of which is determined by the height of the passage 69 above the bottom 65 of the chamber. As the slab 63 projects into this pool the latter seals the passage 69 from the atmosphere.

Suitable heating means are provided for preventing the molten zinc dross in the compartment at the left of the slab 63 as viewed in Fig. 2 from freezing when the pouring operation is discontinued. This heating means, in the embodiment of the invention illustrated, comprises a torch 71 adapted to project a flame into such compartment, the torch, as shown, being provided with a combustible gas supply connection 73 and an air supply connection 75 respectively leading to sources of gas and air under pressure. The flame may be regulated by the valves 77 in these connections. Conveniently the chamber 61 is provided with a port 79 for igniting the gas and air mixture. The products of combustion from the flame will escape from the chamber through the passage 59 and funnel 57 to the atmosphere.

In operation, the furnace chamber 17 may be filled with molten zinc dross in the way above described to a level A. Sufficient current may be passed through the resistors to radiate heat downwardly from them and the roof slabs 37 of the furnace chamber to heat the surface portion of the pool to a temperature of about 1700 to 2000° F. which will cause zinc rapidly to evaporate from such surface and pass through the conduit 47 into the condenser 49 where the zinc vapors will condense into liquid zinc and collect at the bottom of the condenser. From time to time the molten zinc may be discharged from the condenser through the normally plugged tap 81 and cast into slabs.

From time to time additional molten zinc dross may be charged into the furnace chamber until there accumulates at the bottom of the chamber a mass of the residue up to say the level C, whereupon the current flowing through the heating resistors may be increased to raise the contents of the furnace to about 2750° F. for melting such accumulation. When molten this accumulation may be discharged from the furnace chamber through the normally plugged tap 83.

In practice, but without limitation thereto, the furnace chamber may be about 4⅓ feet wide and 9 feet long so as to cause the pool of molten dross therein to present a free upper surface of considerable area. The molten dross may initially fill the chamber to a depth of about 24 inches, and when the accumulated residue fills the bottom portion of the chamber to a depth of about 18 inches that residue may be melted and discharged from the furnace chamber.

The passage 69 is preferably of such bore and length that no appreciable vaporization of zinc will occur in the compartment of the chamber 61 at the right of the slab 63 as viewed in Fig. 2, or at least insufficient vaporization to cause the iron content of the dross to separate out in that compartment. The material in the compartment just mentioned will be maintained in molten condition by heat conducted from the compartment at the left of the slab 63 as viewed in Fig. 2 and by heat passing from the furnace chamber through the passage 69. Satisfactory results will be secured with a furnace chamber of the dimensions above mentioned when the passage 69 is about 4 inches in diameter and 30 inches long.

It will be understood that the zinc dross is treated in the furnace chamber under non-oxidizing conditions to prevent oxidization of the zinc vapors. For initially clearing the chamber of air, conduits 85 of refractory material, such as silicon carbide or graphite, extending from the exterior of the furnace through the furnace walls and discharging into the furnace chamber may be provided. These conduits may communicate with a pipe 87 leading to a suitable source of nitrogen under pressure, the supply of nitrogen passing through the conduits 85 being controlled by the stop valves 89. Preferably, the damper 53 is so adjusted as to maintain the furnace chamber at just above atmospheric pressure so as to insure against leakage of air into said chamber.

It will be understood that within the scope of the appended claims wide deviations may be made from the steps of the method and embodiment of the apparatus described without departing from the spirit of the invention.

I claim:

1. The method of recovering zinc from mixtures consisting predominantly of zinc and containing iron utilizing a container for the mixture in molten form, which method comprises charging the molten mixture into a container; raising the temperature of the mixture so charged, under substantially non-oxidizing conditions, to a temperature of from 1700° F. to 2000° F. to vaporize zinc from the molten mixture and to cause said mixture to become saturated with iron and the latter progressively to separate therefrom in solid form and sink to the bottom of the container; withdrawing zinc vapors and condensing them to liquid zinc; continuing such charging and vaporization operations until such an accumulation of solid iron is formed in the container as to impair further continuance of such operations; finally raising the temperature of the container contents for melting such accumulation; and discharging the molten accumulation from the container to permit the charging and vaporizing operations to be continued.

2. The method of recovering zinc from mixtures consisting predominantly of zinc and containing iron utilizing a container for the mixture in molten form, which method comprises charging the molten mixture into the container to form therein a body of the molten mixture having a free upper surface; raising the temperature of the mixture so charged, under substantially non-oxidizing conditions, by radiating heat downward on said free surface to a temperature from 1700° F. to 2000° F. to vaporize zinc from the molten mixture and to cause said mixture to become saturated with iron and the latter progressively to separate therefrom in solid form and sink to the bottom of the container; withdrawing zinc vapors and condensing them to liquid zinc; continuing such charging and vaporization operations until such an accumulation of solid iron is formed in the container as to impair further continuance of such operations; finally raising the temperature of the container contents for melting such accumulation; and discharging the molten accumulation from the container to permit the charging and vaporizing operations to be continued.

FRANK F. POLAND.

REFERENCES CITED

The following references are of record in the file of this patent:

UNITED STATES PATENTS

| Number | Name | Date |
|---|---|---|
| 905,280 | Betts | Dec. 1, 1908 |
| 1,298,722 | Huldt | Apr. 1, 1919 |
| 1,515,140 | Bornemann | Nov. 11, 1924 |
| 2,174,559 | Anderson et al. | Oct. 3, 1939 |
| 2,215,961 | Hawk | Sept. 24, 1940 |

Certificate of Correction

Patent No. 2,463,468.                                                           March 1, 1949.

FRANK F. POLAND

It is hereby certified that error appears in the printed specification of the above numbered patent requiring correction as follows:

Column 5, line 28, claim 1, for "a container" read *the container*; and that the said Letters Patent should be read with this correction therein that the same may conform to the record of the case in the Patent Office.

Signed and sealed this 2nd day of August, A. D. 1949.

[SEAL]

THOMAS F. MURPHY,
*Assistant Commissioner of Patents.*